(12) United States Patent
Haartsen et al.

(10) Patent No.: US 8,005,431 B2
(45) Date of Patent: Aug. 23, 2011

(54) CONTROLLING ATTENUATION OF AN ANTENNA SIGNAL IN A COMMUNICATION TERMINAL TO REESTABLISH A LOST COMMUNICATION LINK

(75) Inventors: Jacobus Cornelis Haartsen, Hardenberg (NL); Franciscus Nicolaas Martinus Hooijschuur, Emmen (NL)

(73) Assignee: Sony Ericsson Mobile Communications AB (SE)

( * ) Notice: Subject to any disclaimer, the term of this patent is extended or adjusted under 35 U.S.C. 154(b) by 415 days.

(21) Appl. No.: 12/261,588

(22) Filed: Oct. 30, 2008

(65) Prior Publication Data
US 2010/0069014 A1    Mar. 18, 2010

Related U.S. Application Data

(60) Provisional application No. 61/096,980, filed on Sep. 15, 2008.

(51) Int. Cl.
*H04B 17/00* (2006.01)
(52) U.S. Cl. ............... 455/67.11; 455/41.2; 455/522; 455/69
(58) Field of Classification Search ............ 455/67.11, 455/41.3, 41.2, 69, 522, 67.13, 134, 420, 455/62, 66.1, 115.1, 126, 127.1
See application file for complete search history.

(56) References Cited

U.S. PATENT DOCUMENTS

| | | | |
|---|---|---|---|
| 2003/0157910 A1* | 8/2003 | Bruckmann et al. | 455/130 |
| 2004/0127216 A1* | 7/2004 | Fukushima | 455/432.2 |

FOREIGN PATENT DOCUMENTS
WO    WO 99/45653 A1    9/1999

OTHER PUBLICATIONS

Notification of Transmittal of the International Preliminary Report on Patentability; International Preliminary Report on Patentability corresponding to International Application No. PCT/IB2009/051070; Date of Mailing: Dec. 7, 2010; 8 pages.
"Current-Source DAC with PIN Diode Provides RF Attenuation and Thermal Compensation", Application Note 3990, Mar. 8, 2007, downloaded Jul. 8, 2009 from http://www.maxim-ci.com/appnotes.cfm/an_pk/3990.
Haartsen et al., "Bluetooth—A New Low-Power Radio Interface Providing Short-Range Connectivity", Proceedings of the IEEE, 88(10):1651-1661 (2000).
Notification of Transmittal of the International Search Report and the Written Opinion of the International Searching Authority, or the Declaration; International Search Report; Written Opinion of the International Searching Authority, PCT International Application No. PCT/IB2009/051070, Jul. 22, 2009.

* cited by examiner

*Primary Examiner* — John J Lee
(74) *Attorney, Agent, or Firm* — Myers Bigel Sibley & Sajovec, P.A.

(57) ABSTRACT

Some embodiments of the present invention are directed to methods of operating communication terminals. A wireless communication link is established between first and second communication terminals and communication signals are exchanged therebetween. The first communication terminal is controlled to continue over time to increase a power level at which it transmits communication signals to the second communication terminal in response to detecting loss of the wireless communication link and while continuing attempts to reestablish the communication link with the second communication terminal. The first communication terminal is further controlled, in response to detecting loss of the communication link, to increase a level of attenuation that it applies to communication signals from the second communication terminal, and to then more gradually decrease the level of attenuation over time in response to continuing attempts to reestablish the communication link with the second communication terminal.

19 Claims, 7 Drawing Sheets

CONTROLLING ATTENUATION OF AN ANTENNA SIGNAL IN A COMMUNICATION TERMINAL TO REESTABLISH A LOST COMMUNICATION LINK

CROSS REFERENCE TO RELATED APPLICATION

The present application claims the benefit of and priority to U.S. Provisional Patent Application No. 61/096,980, filed Sep. 15, 2008, entitled "CONTROLLING ATTENUATION OF AN ANTENNA SIGNAL IN A COMMUNICATION TERMINAL TO REESTABLISH A LOST COMMUNICATION LINK," the disclosure of which is hereby incorporated herein by reference in its entirety.

FIELD OF THE INVENTION

The present invention relates to electronic wireless communication terminals and, more particularly, to controlling transceiver circuitry that establishes wireless communication links between wireless communication terminals.

BACKGROUND OF THE INVENTION

Wireless piconets are widely used to allow short-range, ad-hoc wireless communications between adjacent terminals. Bluetooth is a well known short-range wireless piconet standard that can allow many terminals to be connected together in a short-range ad-hoc piconet. For example, Bluetooth-enabled terminals are widely used to allow a headset to wirelessly communicate with a mobile telephone, a mobile telephone to communication through a vehicle sound system, and for terminals to exchange digital audio, pictures, and/or video data.

In a short-range wireless piconet, one terminal generally operates as a master device, and one or more other terminals operate as slave devices. For example, the Bluetooth headset may be a slave, whereas the mobile telephone, vehicle sound system, digital audio device, computer, PDA, etc., may be the master.

Because terminals that are communicating through a short-range wireless piconet are located relatively close to one another, moving the terminals small distances relative to one another can result in significant changes in the strength of the communication signals that they receive from each other. In an attempt to compensate for changes in received signal strength, some Bluetooth terminals are configured to control the transmission power level of each other via their exchange of power control commands. Existing power control processes may not sufficiently control power levels when the terminals are rapidly moved relative to each other, and which can result in loss of communication links between the terminals.

SUMMARY OF THE INVENTION

Some embodiments of the present invention are directed to methods of operating communication terminals. A wireless communication link is established between first and second communication terminals and communication signals are exchanged therebetween. The first communication terminal is controlled to continue over time to increase a power level at which it transmits communication signals to the second communication terminal in response to detecting loss of the wireless communication link and while continuing attempts to reestablish the communication link with the second communication terminal. The first communication terminal is further controlled, in response to detecting loss of the communication link, to increase a level of attenuation that it applies to communication signals from the second communication terminal, and to then more gradually decrease the level of attenuation over time in response to continuing attempts to reestablish the communication link with the second communication terminal.

In some further embodiments, the first communication terminal can be controlled to abruptly increase the level of attenuation in response to detecting loss of the communication link, and to then more gradually decrease the level of attenuation over time in response to continuing attempts to reestablish the communication link with the second communication terminal.

The first communication terminal may be configured to attempt to communicate with the second communication terminal in response to occurrence of defined timing events. The first communication terminal can be controlled to abruptly increase the level of attenuation in response to detecting loss of the communication link, and to then incrementally decrease the level of attenuation in response to occurrence of the defined timing events and to continuing attempts to reestablish the communication link with the second communication terminal.

The first communication terminal can be controlled to incrementally decrease the level of attenuation in response to occurrence of defined time division multiple access timeslots, during which the first communication terminal attempts to receive communication signals from the second communication terminal, and to continuing attempts to reestablish the communication link with the second communication terminal.

Control of the first communication terminal can further include incrementally increasing its transmission power level in response to occurrence of the define timing events and to continuing attempts to reestablish the communication link with the second communication terminal.

The first communication terminal can be controlled to incrementally increase its transmission power level in response to occurrence of defined time division multiple access timeslots, during which the first communication terminal transmits communication signals to the second communication terminal, and to continuing attempts to reestablish the communication link with the second communication terminal.

The first communication terminal can be controlled to cease further increase of the power level when the power level reaches a maximum transmission power level for the first communication terminal.

The first communication terminal can be controlled to cease further decreasing of the level of attenuation when the level of attenuation reaches a minimum attenuation level.

The first communication terminal can be controlled, in response to detecting loss of the wireless communication link, to increase a level of attenuation that it applies to communication signals from the second communication terminal, and to then more gradually decrease the level of attenuation over time in response to continuing attempts to reestablish the communication link with the second communication terminal. The first communication terminal can be further controlled to continue to increase over time a power level at which it transmits communication signals in response to detecting loss of the communication link and to continuing attempts to reestablish the communication link with the second communication terminal.

The first communication terminal can control a level of attenuation that a variable attenuator applies to a signal in a signal pathway between an antenna and a low noise amplifier of the first communication terminal.

The first communication terminal can control the variable attenuator to cause the signal to be attenuated with at least a threshold level of attenuation in response detecting loss of the communication link, and then further control the variable attenuator to cause the signal to be attenuated with decreasing levels of attenuation over time in response to continuing attempts to reestablish the communication link with the second communication terminal.

The first communication terminal can detect that the wireless communication link has become lost in response to not receiving a communication response from the second communication terminal within a threshold time after transmission of data to the second wireless communication terminal.

The first communication terminal can detect that the wireless communication link has become lost in response to determining that bit errors in a data packet received from the second wireless communication terminal exceeds a threshold number.

Some other embodiments of the present invention are directed to a communication terminal includes a RF receiver circuit and a controller. The RF receiver circuit is configured to receive communication signals from another communication terminal through a wireless communication link. The controller is configured to respond to detecting loss of the communication link by increasing a level of attenuation that is applied to communication signals from the other communication terminal, and by then more gradually decreasing the level of attenuation over time in response to continuing attempts to reestablish the communication link with the other communication terminal.

In some further embodiments, the controller can be further configured to abruptly increase the level of attenuation in response to detecting loss of the communication link, and to then incrementally decrease the level of attenuation in response to occurrence of defined timing events, during which the RF receiver circuit attempts to receive communication signals from the other communication terminal, and to continuing attempts to reestablish the communication link with the other communication terminal.

The RF receiver circuit can include a variable attenuator that applies a controllable level of attenuation to a signal in a signal pathway between an antenna and a low noise amplifier. The controller can be further configured to control the level of attenuation by the variable attenuator, and to respond to detecting loss of the communication link by increasing the level of attenuation by the variable attenuator and by then more gradually decreasing the level of attenuation by the variable attenuator over time in response to continuing attempts to reestablish the communication link with the other communication terminal.

The variable attenuator can include a pin diode and a current source that supplies a controllable bias current level to the pin diode. The pin diode is connected to the signal pathway and is configured to vary an attenuation level of the signal in response to changes in the bias current level. The controller can be further configured to control the current source to regulate the bias current level.

The variable attenuator can include a capacitor and a voltage source that supplies a controllable bias voltage level to the capacitor. The capacitor is connected to the signal pathway and is configured to vary an attenuation level of the signal in response to changes in the bias voltage level. The controller can be further configured to control the voltage source to regulate the bias voltage level.

The communication terminal can further include a RF transmitter circuit that is configured to transmit communication signals to the other communication terminal through the wireless communication link. The controller can be further configured to continue over time to increase a power level at which it transmits communication signals to the other communication terminal in response to loss of the wireless communication link and to continuing attempts to reestablish the communication link with the other communication terminal.

The controller can be further configured to incrementally increase the transmission power level in response to occurrence of defined timing events, during which the RF transmitter circuit transmits communication signals to the other communication terminal, in response to continuing attempts to reestablish the communication link with the other communication terminal.

BRIEF DESCRIPTION OF THE DRAWINGS

The accompanying drawings, which are included to provide a further understanding of the invention and are incorporated in and constitute a part of this application, illustrate certain embodiments of the invention. In the drawings.

DETAILED DESCRIPTION OF EMBODIMENTS OF THE INVENTION

The present invention now will be described more fully hereinafter with reference to the accompanying figures, in which embodiments are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" (and variants thereof) when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" to another element/step (and variants thereof), it can be directly responsive to the other element/step, or intervening elements/steps may be present. In contrast, when an element/step is referred to as being "directly responsive" to another element/step (and variants thereof), there are no intervening elements/steps present. As used herein the term "and/or" includes any and all combinations of one or more of the associated listed items and may be abbreviated as "/".

It will be understood that, although the terms first, second, third, etc. may be used herein to describe various elements, these elements should not be limited by these terms. These terms are only used to distinguish one element from another.

The present invention is described below with reference to block diagrams and/or flowchart illustrations of methods, apparatus (systems and/or devices) and/or computer program products according to embodiments of the invention. It is understood that a block of the block diagrams and/or flowchart illustrations, and combinations of blocks in the block diagrams and/or flowchart illustrations, can be implemented by hardware and/or in software (including firmware, resident software, micro-code, etc.), referred to herein as "circuitry" or "circuit". For example, some of the functionality my be implemented in computer program instructions that may be provided to a processor of a general purpose computer, special purpose computer, digital signal processor and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a processor of the computer and/or other programmable data processing apparatus to function in a particular manner, such that the instructions stored in the computer-readable memory produce an article of manufacture including instructions which implement the function/act as specified in the block diagrams and/or flowchart block or blocks. The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

A computer-usable or computer-readable medium may be, for example but not limited to, an electronic, magnetic, optical, electromagnetic or semiconductor system, apparatus or device. More specific examples (a non-exhaustive list) of the computer-readable medium would include the following: a portable computer diskette, a random access memory (RAM), a read-only memory (ROM), an erasable programmable read-only memory (EPROM or Flash memory), and a portable optical and/or magnetic media, such as a flash disk or CD-ROM.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Although some of the diagrams include arrows on communication paths to show a primary direction of communication, it is to be understood that communication may occur in the opposite direction to the depicted arrows.

As used herein, a "wireless communications terminal" or "terminal" may include Bluetooth, cellular, wireless local area network (WLAN), and/or other wireless communications capabilities, and may combine voice and/or data communications capabilities.

Various embodiments of the present invention are described herein in the context of a wireless communication terminal ("terminal") that includes Bluetooth communications capabilities. However the invention is not limited thereto, as it may be incorporated within other types of terminals.

For example, other embodiments of the invention may be used in terminals that include WLAN communication capabilities and/or cellular communication capabilities. A cellular communication terminal may be configured to communicate according to one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and/or Universal Mobile Telecommunications System (UMTS).

In Bluetooth communications terminals, the transmission power level of a transmitting (TX) terminal is controlled to reduce the dynamic range (DR) requirements at a receiving (RX) terminal. The dynamic range of the receiving terminal is limited on the high end by the maximum received level, and on the low end by the minimum receivable level of a communication signal from a coupled antenna.

For communications terminals that are communicating through a Bluetooth piconet communication link therebetween, the communication link between the terminals may be lost if any of their receiver circuitry gets out of range and the received radio signal drops below the minimum detection level. For short-range radio communications, such as Bluetooth, the communication link can also be lost when the received signal has become too strong because of the close proximity between the terminals, which can cause the front-end receiver circuit to become saturated due to nonlinearities and result in an inability to detect received signals.

For short-range radio communications, the communication link loss (e.g., the minimum propagation loss between the antenna of the transmitter terminal and the antenna of the receiver terminal) can be very small (e.g. less than about 3 dB) because the transmitting and receiving terminals can be in very close proximity (e.g. a few cm) to each other. Because most Bluetooth receivers have a maximum receiving level of −20 to −10 dBm, they must be able to regulate the transmitter power level so as to be at a very low level (e.g., below about −10 dBm).

The transmission power may be controlled in an attempt to keep the received signal level within the upper and lower operational range of the receiver circuitry of the receiving terminal. A problem can arise when the propagation loss varies very quickly with respect to the rate at which the transmitter power is controlled. If a short-range communication link becomes lost, the terminals may not know whether the signal is too weak (in which case the transmitting terminal should increase its transmission power) or is too strong (in which case the transmitting terminal should decrease its transmission power).

For example, during a Bluetooth sniff mode a pair of terminals may only communicate every 1.28 seconds, or at even longer time intervals, when the Bluetooth communication circuit temporarily wakes up (e.g., powers on). Accordingly, if the terminals are rapidly moving relative to one another, during the Bluetooth sniff mode the power level of a transmitting terminal may not adequately track the change in communication coupling loss and may, thereby, result in the received power level becoming outside the dynamic range of the receiver circuit of the receiving terminal and cause a loss of the communication link between the terminals. The receiving terminal may not have a way to determine whether to request that the transmitting terminal increase or decrease its transmission power level to enable reestablishment of the communication link therebetween.

Various embodiments of the present invention may arise from the present realization that when a short-range communication link is lost between two terminals, it may be reestablished by causing the transmitting terminal to increase its output transmitter power toward a high level, and at the same time causing the receiving terminal to controllably attenuate the antenna signal beginning with a high attenuation level and backing-off toward a low attenuator level until the transmitted signal can be detected by the receiving terminal and the communication link therebetween can be reestablished. In this manner, the transmitted signal power level and the received signal power level, output from the attenuator, converge toward a range that enable proper data detection by the receiving terminal.

As used herein, the term "attenuation" includes both positive and negative levels of gain. Accordingly, a variable attenuation that applies a variable level of attenuation may be controlled to variably decrease the amplitude of a signal and/or to variably increase the amplitude of the signal.

Accordingly, some embodiments are directed to methods of operating communication terminals. A wireless communication link is established between first and second communication terminals and communication signals are exchanged therebetween. The first communication terminal is controlled to continue over time to increase a power level at which it transmits communication signals to the second communication terminal in response to detecting loss of the wireless communication link and while continuing attempts to reestablish the communication link with the second communication terminal. The second communication terminal is controlled, in response to detecting loss of the communication link, to increase a level of attenuation that it applies to communication signals from the first communication terminal, and to then more gradually decrease the level of attenuation over time in response to continuing attempts to reestablish the communication link with the first communication terminal. Although not necessary, the first and second communication terminals may be configured to operate in the same or similar manner according to various embodiments described herein.

Figure 1:
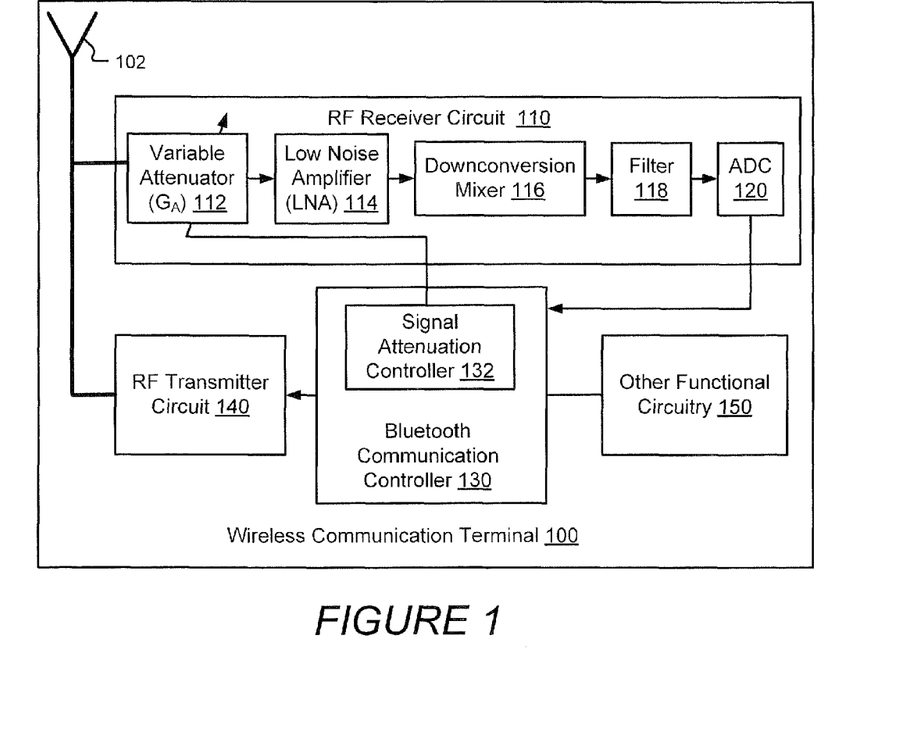
FIG. 1 is a schematic block diagram illustrating a wireless communication terminal that includes RF receiver circuit having a variable attenuator, which attenuates an antenna signal, and a RF transmitter circuit that are controlled in accordance with some embodiments of the present invention.

These and further embodiments of the present invention will now be described with reference to FIGS. 1-9. FIG. 1 is a schematic diagram illustrating a wireless communication terminal 100 that includes a RF receiver circuit 110 having a variable attenuator 112 that attenuates the output of an antenna 102 with an attenuation level that is controlled in accordance with some embodiments of the present invention. The exemplary wireless communications terminal 100 shown in FIG. 1 further includes a Bluetooth communication controller 130, a RF transmitter circuit 140, and other functional circuitry 150.

The RF transmitter circuitry 140 may be configured as the transmitter RF front-end that is used when the terminal 100 is transmitting according to the Bluetooth protocol. As explained above, the power level that is output by the RF transmitter circuit 140 may be controlled by, for example, the Bluetooth communications controller 130 in response to control signals received from another communication terminal that is communicating with the terminal 100 through a Bluetooth communication link. The functional circuit 140 may be configured to provide operations that enable the wireless communication terminal to operate as, for example, a wireless headset, a cellular phone, a personal data assistant (PDA), a wireless keyboard and/or mouse, and/or a desktop/laptop/palmtop computer.

The exemplary RF receiver circuit 110, which can function as the Bluetooth RF receiver front-end, includes the variable attenuator 112, a low noise amplifier 114, a downconversion mixer 116, a baseband filter 118, and an analog to digital converter (ADC) 120. The low noise amplifier 114 is configured to amplify an incoming communication signal from the other communication terminal. The downconversion mixer 116 is configured to down-convert the amplified signal that is output by the low noise amplifier 114 to generate a baseband frequency signal. The baseband filter 118 is configured to filter the baseband frequency signal to generate a filtered baseband signal. The ADC 120 is configured to sample the filtered baseband signal to generate a sequence of digital data signal samples.

The variable attenuator 112 applies a controllable level of attenuation (e.g., $G_A$) to a signal in a signal pathway between the antenna 102 and the low noise amplifier 114. An attenuation controller 132 can control the level of attenuation by the variable attenuator 112. The attenuation controller 132 can respond to detecting loss of the communication link by increasing the level of attenuation by the variable attenuator 112 and by then more gradually decreasing the level of attenuation by the variable attenuator 112 over time in response to continuing attempts by the Bluetooth communication controller 130 to reestablish the communication link with the other communication terminal.

In FIG. 1, a variable attenuator 112 has been placed at the beginning of the front-end chain to prevent saturation. Depending on the circuit implementation, saturation can occur in any of the front-end elements 114, 116, 118 and/or 120. The attenuator can therefore be placed at different locations in the chain. For example, if the ADC 120 would be the first to saturate under high signal conditions, the variable attenuator could be placed between the filter 118 and the ADC 120. Alternatively, the variable attenuation could be implemented as a variable gain. So instead of using an explicit attenuator 112, an increase attenuation in the chain (corresponding to a decreased gain) can be obtained by decreasing the gain in the LNA 114.

In some further embodiments, when the terminal 100 detects loss of the communication link, the RF transmitter circuit 140 is controlled by the Bluetooth communication controller 130 and/or by the attenuation controller 132 to continue to increase its output power toward a high level (e.g. maximum level) until the transmitted signal is properly detected and received by the other terminal and a communications link is reestablished therewith. In contrast, when the terminal 100 detects loss of a communication link, the attenuation controller 132 controls the variable attenuator 112 to provide a high level of attenuation (e.g., a maximum level) and to then continue to reduce the attenuation toward a low attenuation level until the signals from the other terminal are properly detected and received and a communication link is reestablished with the other terminal.

Figure 2:
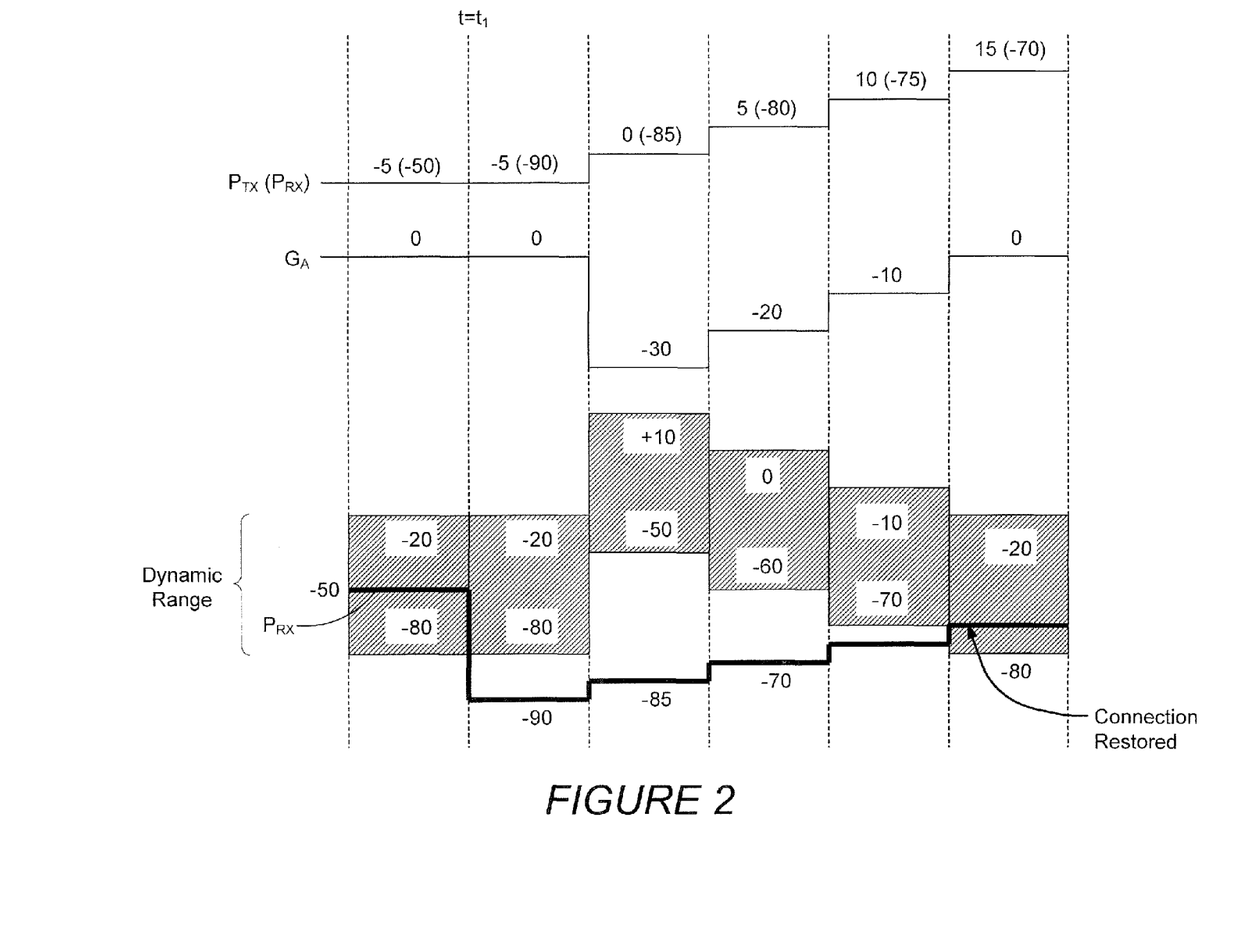
FIG. 2 illustrates graphs that show how the variable attenuator of FIG. 1 may be controlled in response loss of a communication link due to a sudden increase in the propagation loss across the communication link in accordance with some embodiments of the present invention.
Figure 3:
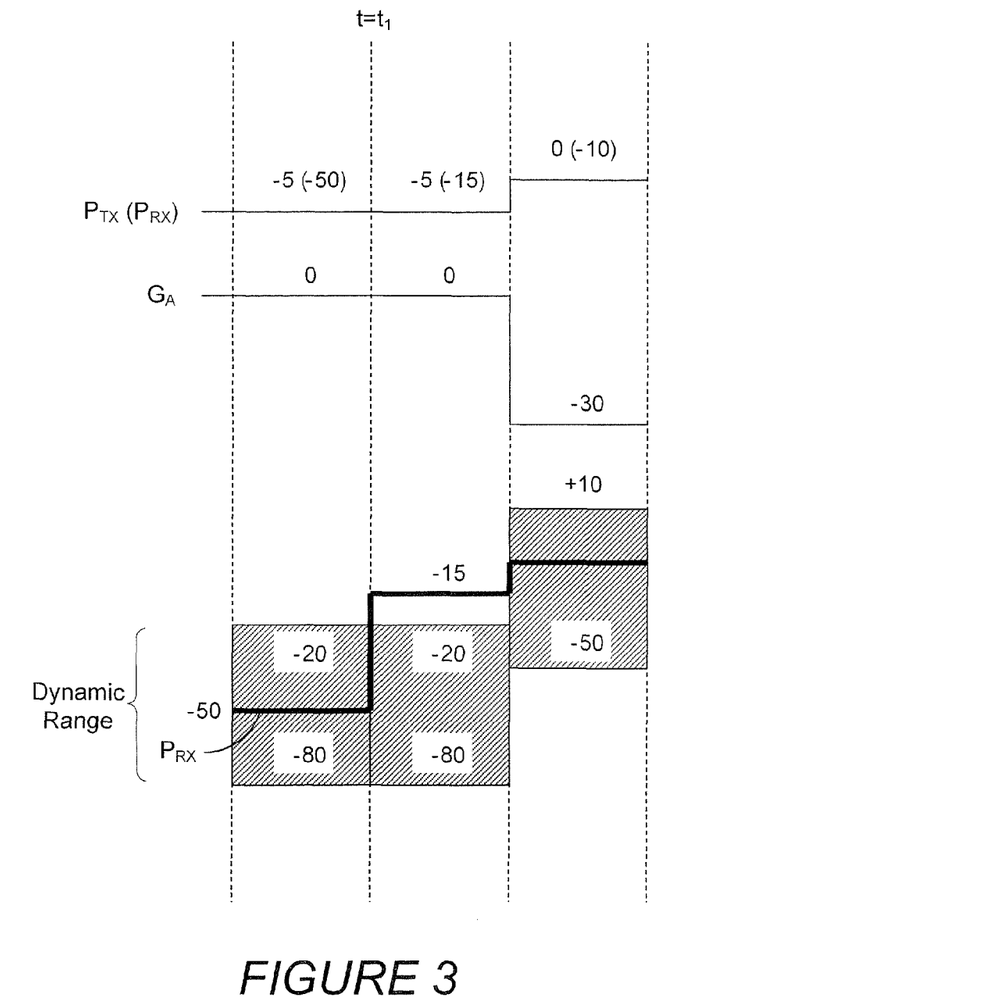
FIG. 3 illustrates graphs that show how the variable attenuator of FIG. 1 may be controlled in response loss of a communication link due to a sudden decrease in the propagation loss across the communication link in accordance with some embodiments of the present invention.

FIG. 2 illustrates graphs that show how the variable attenuator 112 of FIG. 1 may be controlled in response loss of a communication link due to a sudden increase in the propagation loss across the communication link in accordance with some embodiments of the present invention. FIG. 3 illustrates graphs that show how the variable attenuator 112 of FIG. 1 may be controlled in response loss of a communication link due to a sudden decrease in the propagation loss across the communication link in accordance with some embodiments of the present invention. Although various operations are described in the context of performing step-wise incremental changes to the transmitter output power from the RF transmitter circuit 140 and to the attenuation level of the variable attenuator 112, the invention is not limited thereto. It is to be understood that the transmitter output power and/or the attenuation level of the variable attenuator 112 may be changed in a more continuous manner, such as by ramping the levels more continuously over time.

By way of further example, in response to losing a communication link, the transmitter circuit 140 increases its transmission power $P_{TX}$ by, for example, $\Delta_1$ dB increments in response to occurrence of new transmission events and to continuing attempts by the Bluetooth communication controller 130 to reestablish the communication link with the other terminal. The transmission events may correspond to periodic time division multiple access timeslots during which the terminal 100 transmits communication signals to the other terminal. If the maximum transmission power level is reached before the communication link is reestablished, the transmission power level may be maintained at that level.

Also in response to losing the communication link, the attenuation controller 132 abruptly increases the attenuation level by the variable attenuator 112 to a high (e.g. maximum) attenuation level (e.g., $G_{A,max}$). The attenuation controller 132 then incrementally lowers the attenuation level by, for example, $\Delta_2$ dB increments in response to occurrence of new receiving events and to continuing attempts by the Bluetooth communication controller 130 to reestablish the communication link with the other terminal. The receiving events may correspond to periodic time division multiple access timeslots during which the terminal 100 attempts to receive communication signals from the other terminal. If the attenuation level reaches a minimum level power level (e.g., $G_A$=0 dB) before the communication link is reestablished, the attenuation level may be maintained at that level.

Referring to FIG. 2, a link budget diagram is shown. With an initial transmit power $P_{TX}$ of −5 dBm and a propagation loss of 45 dB, the received power level $P_{RX}$ amounts to −50 dBm which is in the middle of the receiver dynamic range which is ranging from −80 dBm up to −20 dBm. At time instant $t_1$ the communications link experiences an additional propagation loss of 40 dB, causing the propagation loss to increase from 45 dB to 85 dB. The received signal power level drops from −50 dBm to −90 dBm, which is outside the dynamic range of the RF receiver circuit 110, which is −80 dBm to −20 dBm. As a result of losing the communication link, the controller 130 increases the transmission power of the transmitter circuit 140 of the transmitting terminal each step by $\Delta_1$=5 dB.

In a similar manner, the attenuation controller 132 causes the variable attenuator 112 to add an additional attenuation of $G_A$=−30 dB. This results in a shift in the dynamic range of the RF receiver circuit 110 now ranging from −50 dBm up to +10 dBm (ignoring the noise increase which can be introduced by the attenuation). At each subsequent receive event, the attenuation level is reduced by $\Delta_2$=10 dB.

As shown in FIG. 2, after four steps, the received signal (shown as the thick black solid line) becomes within the dynamic range of the receiver circuit 110 so that the communication signals from the other terminal can be properly detected and received and, consequently, the communication link therebetween can be reestablished. The terminal 100 can now request that the other terminal increases its transmission power so that the power of the received signal returns back to the −50 dBm level, and the terminal 100 can correspondingly continue to decrease the signal attenuation level as the other terminal increases its transmission power level.

Referring now to FIG. 3, which corresponds to the situation when a communication link is lost due to a sudden decrease in the propagation loss across the communication link, such as due to the terminals becoming too close together. As shown in FIG. 3, a 35 dB drop occurs in the propagation loss across a communication link. The received signal level therefore abruptly rises from −50 dBm to −15 dBm, which is outside the dynamic range of the receiver circuit 110, which is ranging from −80 dBm up to −20 dBm.

In response to losing the communication link, the attenuation controller 132 abruptly raises the attenuation level of the variable attenuator 112 to 30 dB, which results in a shift in the dynamic range now ranging from −50 dBm up to +10 dBm. The controller 130 incrementally increases the transmission power from the transmitter circuit 140. As shown in FIG. 3, in one step the signal level is back within the dynamic range of the receiver circuit 110 of the terminal 100. The terminal 100 responds thereto by instructing the other terminal to lower its transmission power. The attenuation controller 132 of the terminal 100 then subsequently lowers the attenuation level of the variable attenuator 112 until the attenuation level returns back to a normal level for receiving signals through the communication link (e.g., 0 dB).

Note that irrespective of whether the propagation loss was increased (FIG. 2) or decreased (FIG. 3), the actions in the transmitter and receiver are the same (e.g. a slow increase of the transmit power in the transmitter and an abruptly increase followed by a slow decrease of the attenuation at the receiver.

Figure 4:
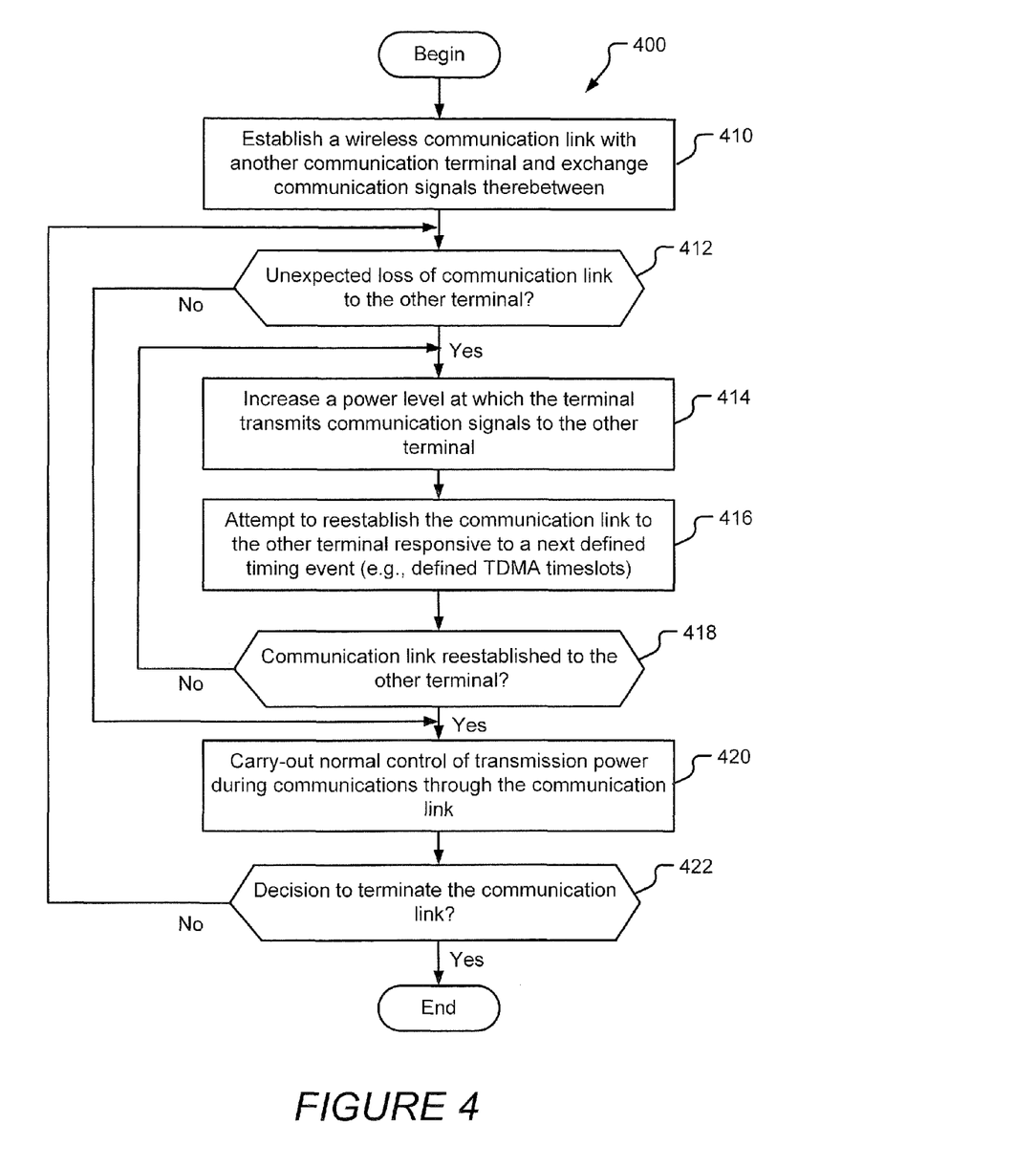
FIG. 4 is a flowchart of operations that may be carried out by a wireless communication terminal to control the transmission power level from a RF transmitter while attempting to reestablish a lost communication link in accordance with some embodiments of the present invention.

These and further embodiments will now be described with regard to the flowcharts of FIGS. 4 and 5. FIG. 4 is a flowchart of operations 400 that may be carried out by the terminal 100, such as by the Bluetooth communication controller 130 and the attenuation controller 132, to control the transmission power level from the RF transmitter 140 while the Bluetooth communication controller 130 attempts to reestablish a lost communication link in accordance with some embodiments of the present invention.

Referring to FIG. 4, the Bluetooth communication controller 130 establishes (block 410) a Bluetooth communication link with another communications terminal and exchanges communication signals therewith. A decision is made (block 412) as to whether the communication link with the other terminal has been unexpectedly lost. The Bluetooth communication controller 130 may, for example, detect that the communication link has become lost in response to not receiving a communication response from the other terminal within a threshold time after transmission of data to the other terminal. Alternatively or additionally, the Bluetooth communication controller 130 may detect that the communication link has become lost in response to determining that a number of bit errors in a data packet received from the other terminal exceeds a threshold number.

In response to determining that the communication link is lost, the Bluetooth communication controller 130 can control the RF transmitter circuit 140 to increase its transmission power level (block 414) by a defined incremental amount. The Bluetooth communication controller 130 attempts to reestablish the communication link to the other terminal (block 416) in response to occurrence of a next defined communication timing event (e.g., periodic time division multiple access communication timeslots that are assigned to the terminals).

A decision is made as to whether the communication link has been reestablished to the other terminal (block 418) and, when it has not been reestablished, the RF transmitter circuit 140 can be controlled to further increase its transmission power level by another incremental amount and another attempt can be carried out to reestablish the communication link to the other terminal (block 414 and 416). Accordingly, the terminal 100 can incrementally increase its transmission power level in response to occurrence of defined communication timing events and to continuing attempts to reestablish the communication link with the other communication terminal. The RF transmitter circuit 140 can cease further increase of the power level when the power level reaches a maximum transmission power level.

In response to determining (block 418) that the communication link has been reestablished with the other terminal, the Bluetooth communication controller 130 can carry out normal control of the transmission power level from the RF transmitter circuit 140 during communications through the communication link (block 420). The Bluetooth communication controller 130 may therefore decrease the transmission power level back to within a typical range that is used when transmitting data through the ongoing communication link.

While a decision has not been made (block 422) to terminate the communication link (e.g., such as in response to a user terminating a call), operation of blocks 412 through 420 may be repeated to respond to any further loss of the communication link by increasing the transmission power level to facilitate reestablishment of the communication link.

Figure 5:
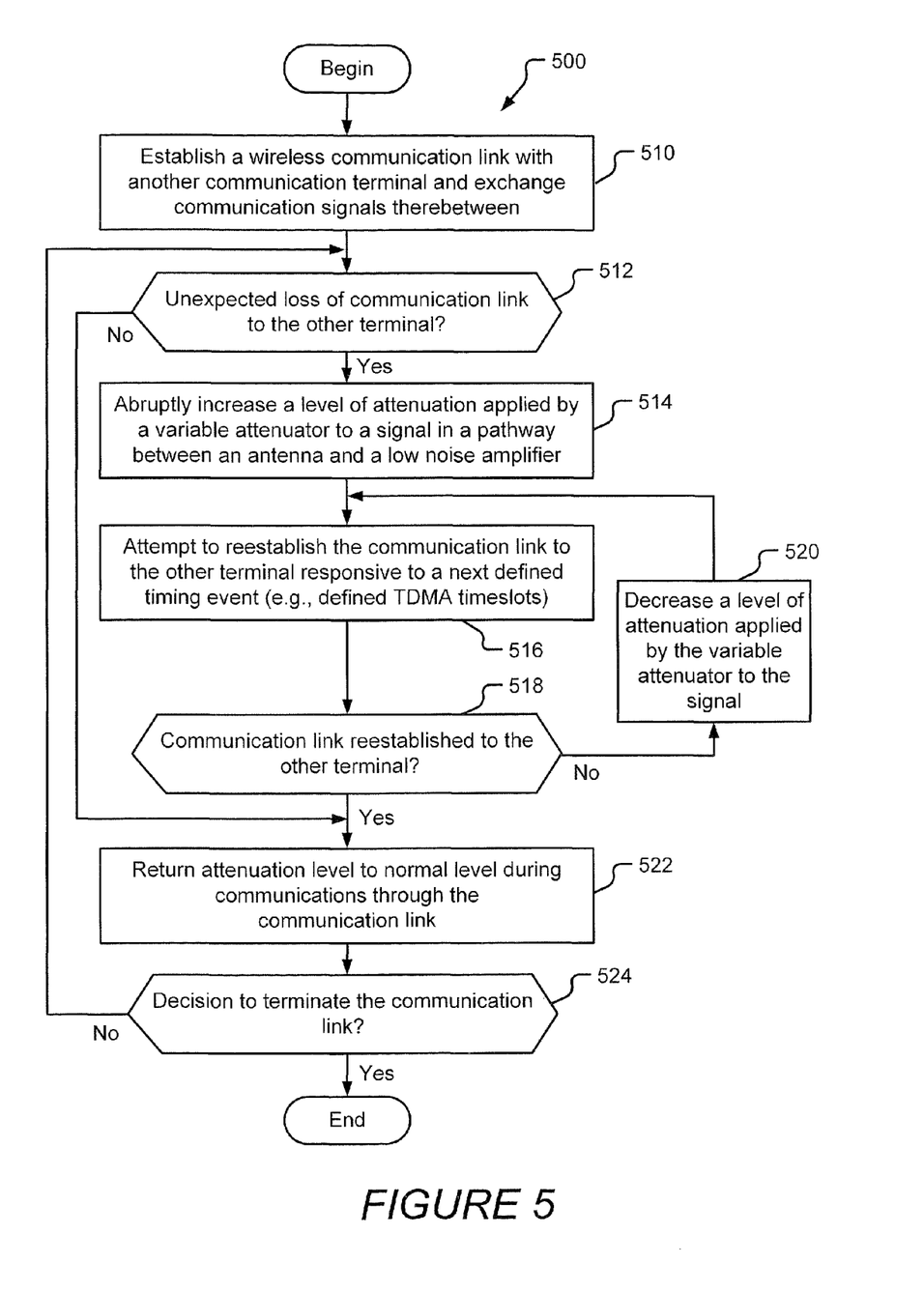
FIG. 5 is a flowchart of operations that may be carried out by a wireless communication terminal to control the level of attenuation by a RF receiver circuit to a communication signal from another communication terminal while attempting to reestablish a lost communication link in accordance with some embodiments of the present invention.

FIG. 5 is a flowchart of operations 500 that may be carried out by the terminal 100, such as primarily by the attenuation controller 132, to control the level of attenuation that the variable attenuator 112 applies to a communication signal from another terminal while the Bluetooth communication controller 130 attempts to reestablish a lost communication link in accordance with some embodiments of the present invention.

Referring to FIG. 5, the Bluetooth communication controller 130 establishes (block 510) a Bluetooth communication link with another communications terminal and exchanges communication signals therewith. A decision is made (block 512) as to whether the communication link with the other terminal has been unexpectedly lost. In response to determining that the communication link is lost, the attenuation controller 132 can control the variable attenuator 112 to abruptly increase a level of attenuation it applies to communication signals in a signal path between, for example, the antenna 102 and the low noise amplifier 114.

The Bluetooth communication controller 130 attempts to reestablish the communication link to the other terminal (block 516) in response to occurrence of a next defined communication timing event (e.g., periodic time division multiple access communication timeslots that are assigned to the terminals). A decision is made as to whether the communication link has been reestablished to the other terminal (block 518) and, when it has not been reestablished, the variable attenuator 112 can be controlled (block 520) to incrementally decrease the level of attenuation by an incremental amount and another attempt can be carried out to reestablish the communication link to the other terminal (block 516).

Accordingly, the terminal 100 can abruptly increase the level of attenuation that is applied to the antenna signal in response to detecting loss of the communication link in preparation for the other terminal increasing its transmission power level, and can then more gradually decrease the level of attenuation over time in response to continuing attempts to reestablish the communication link with the other terminal. Further decreasing of the level of attenuation can cease when the level of attenuation reaches a minimum attenuation level.

In this manner, the transmitted signal power level and the received signal power level between the terminals converge toward a range that enables proper data detection by both terminals and, consequently, enables the terminals to reestablish the communication link.

In response to determining (block 518) that the communication link has been reestablished, the attenuation controller 132 can control the variable attenuator 112 to provide a typical level (e.g., zero attenuation) or range of attenuation during data communications through the communication link (block 522).

While a decision has not been made (block 524) to terminate the communication link (e.g., such as in response to a user terminating a call), operation of blocks 512 through 522 may be repeated to respond to any further loss of the communication link by abruptly increasing and then incrementally decreasing the antenna signal attenuation level to facilitate reestablishment of the communication link.

Some exemplary embodiments of variable attenuators that may be incorporated in the variable attenuator 112 of FIG. 1 are shown in FIGS. 6-9. However it is to be understood that the invention is not limited thereto, and instead covers any attenuator that is configured to carry out at least some of the functionality described herein. The variable attenuator may be configured as a PIN diode or as a variable capacitor connected between antenna 102 and a low noise amplifier 114.

The attenuation circuitry can be configured to provide resistive division and/or capacitive division.

Figure 6:
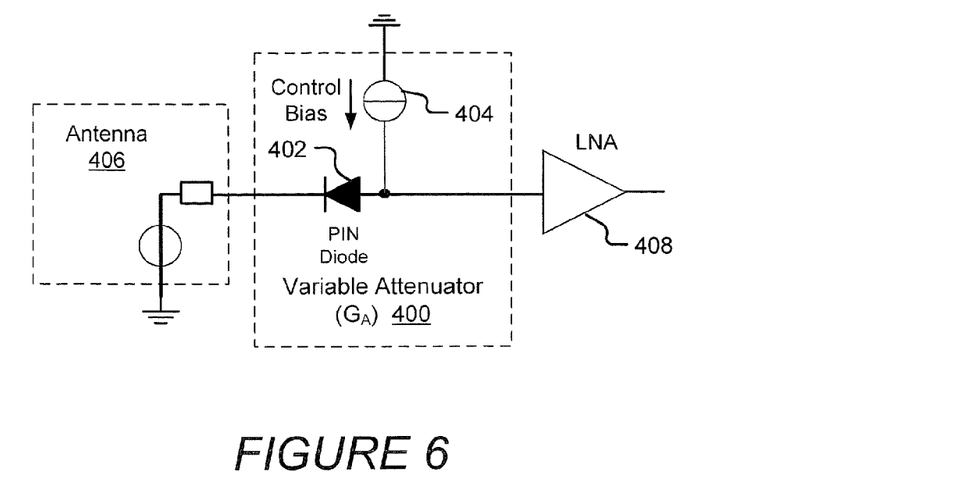
FIG. 6 is a schematic diagram of a pin diode based variable attenuator, which may be used as the variable attenuator of FIG. 1, in accordance with some embodiments of the present invention.
Figure 7:
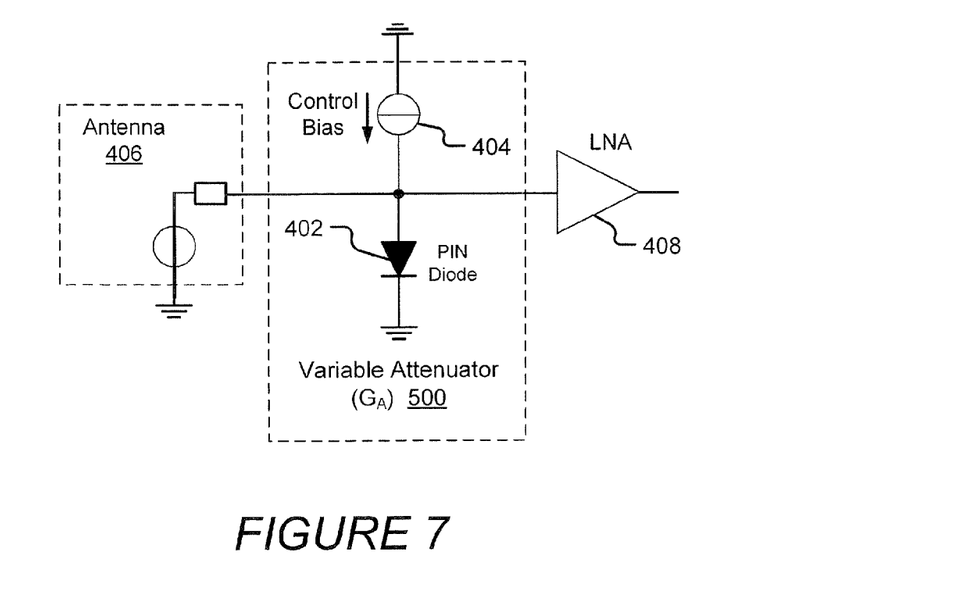
FIG. 7 is a schematic diagram of another pin diode based variable attenuator, which may be used as the variable attenuator of FIG. 1, in accordance with some embodiments of the present invention.

FIGS. 6 and 7 illustrate alternative embodiments of variable attenuators 400 and 500 that are configured to provide resistive division. The variable attenuators 400 and 500 are each configured to apply a controllable level of attenuation to a signal in a signal pathway between an antenna 406 and a low noise amplifier 408. The variable attenuators 400 and 500 each include a pin diode 402 and a current source that supplies a controllable bias current level to the pin diode 402. The attenuation controller 132 is configured to control the current source to regulate the bias current level. The antenna output impedance and the low noise amplifier input impedance may both be 50 ohms. The resistance of the PIN diode can be proportional to the bias current through the diode. The direction of positive current flow from the control current sources is indicated by the arrows illustrated in FIGS. 6 and 7. The attenuator circuit configuration 500 shown in FIG. 7 may be preferable because at a zero bias current, the attenuation is zero without noticeable noise contribution from the PIN diode.

Figure 8:
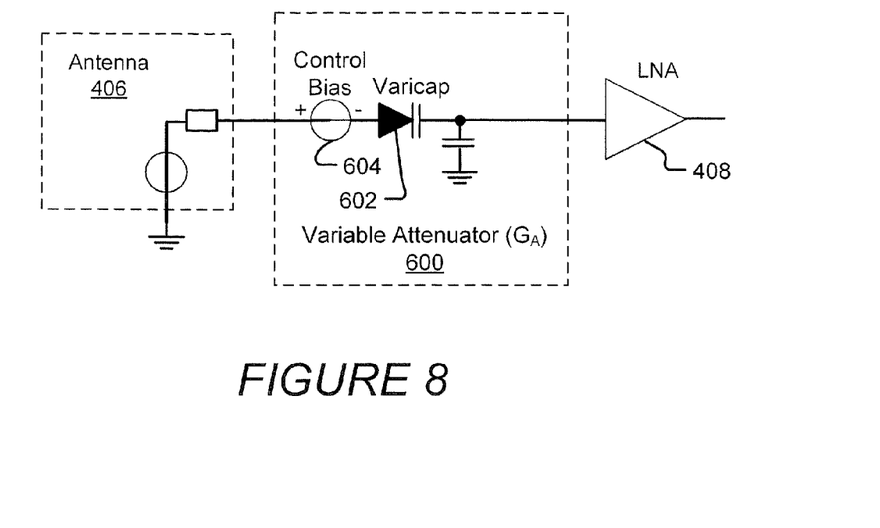
FIG. 8 is a schematic diagram of a capacitor based variable attenuator, which may be used as the variable attenuator of FIG. 1, in accordance with some embodiments of the present invention.
Figure 9:
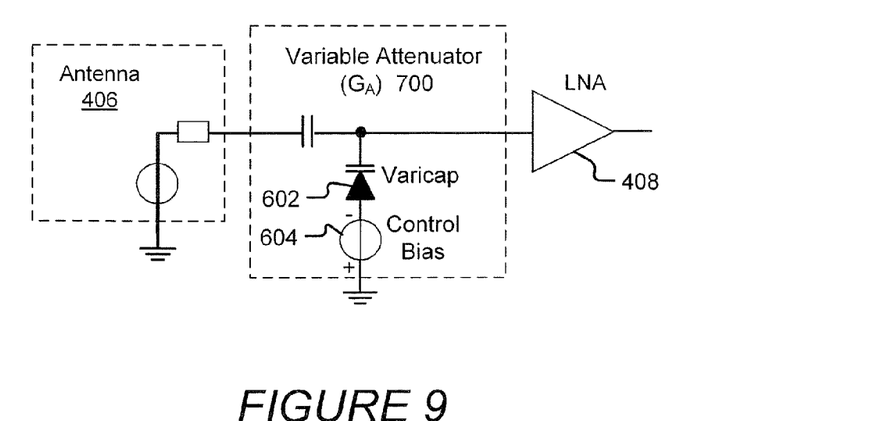
FIG. 9 is a schematic diagram of another capacitor based variable attenuator, which may be used as the variable attenuator of FIG. 1, in accordance with some embodiments of the present invention.

FIGS. 8 and 9 illustrate alternative embodiments of variable attenuators 600 and 700 that are configured to provide variable capacitance. The variable attenuators 600 and 700 each include a variable capacitor 602 and a voltage source 604 that supplies a controllable voltage level to the capacitor 602. The capacitor 602 is connected to the signal pathway between the antenna 406 and the low noise amplifier 408, and is configured to vary an attenuation level of the signal in response to changes in the bias voltage level. The depletion capacitance of the capacitor 602 varies in response to the bias voltage from the voltage source 604 (with polarity indicted by the + and − symbols). The attenuation controller 132 is configured to control the voltage source 604 to regulate the bias voltage level. The attenuator circuit configuration 700 shown in FIG. 9 may be preferable because when it is biased to provide zero attenuation, there is a lesser amount of noise added to the PIN diode or varicap.

As used herein, the controllers can include digital logic circuits including, but not limited to, a gate array, a software instruction execution circuit (e.g., a microprocessor), discrete logic circuit elements, and/or may include analog circuits.

In the drawings and specification, there have been disclosed exemplary embodiments of the invention. Although specific terms are employed, they are used in a generic and descriptive sense only and not for purposes of limitation, the scope of the invention being defined by the following claims.

What is claimed is:

1. A method comprising:
   establishing a wireless communication link between first and second communication terminals and exchanging communication signals therebetween;
   controlling the first communication terminal to continue over time to increase a power level at which it transmits communication signals to the second communication terminal in response to detecting loss of the wireless communication link and while continuing attempts to reestablish the communication link with the second communication terminal; and
   controlling the first communication terminal, in response to detecting loss of the communication link, to increase a level of attenuation that it applies to communication signals from the second communication terminal, and to then more gradually decrease the level of attenuation over time in response to continuing attempts to reestablish the communication link with the second communication terminal.

2. The method of claim 1, wherein the first communication terminal is controlled to abruptly increase the level of attenuation in response to detecting loss of the communication link, and to then more gradually decrease the level of attenuation over time in response to continuing attempts to reestablish the communication link with the second communication terminal.

3. The method of claim 1, wherein:
   the first communication terminal can be configured to attempt to communicate with the second communication terminal in response to occurrence of defined timing events; and
   the first communication terminal is controlled to abruptly increase the level of attenuation in response to detecting loss of the communication link, and to then incrementally decrease the level of attenuation in response to occurrence of the defined timing events and to continuing attempts to reestablish the communication link with the second communication terminal.

4. The method of claim 3, wherein the first communication terminal is controlled to incrementally decrease the level of attenuation in response to occurrence of defined time division multiple access timeslots, during which the first communication terminal attempts to receive communication signals from the second communication terminal, and to continuing attempts to reestablish the communication link with the second communication terminal.

5. The method of claim 3, wherein:
   the first communication terminal is controlled to incrementally increase its transmission power level in response to occurrence of the define timing events and to continuing attempts to reestablish the communication link with the second communication terminal.

6. The method of claim 5, wherein the first communication terminal is controlled to incrementally increase its transmission power level in response to occurrence of defined time division multiple access timeslots, during which the first communication terminal transmits communication signals to the second communication terminal, and to continuing attempts to reestablish the communication link with the second communication terminal.

7. The method of claim 1, further comprising:
   controlling the first communication terminal to cease further increase of the power level when the power level reaches a maximum transmission power level for the first communication terminal.

8. The method of claim 1, further comprising:
   controlling the first communication terminal to cease further decreasing of the level of attenuation when the level of attenuation reaches a minimum attenuation level.

9. The method of claim 1, further comprising:
   controlling the first communication terminal, in response to detecting loss of the wireless communication link, to increase a level of attenuation it applies to communication signals from the second communication terminal, and to then more gradually decrease the level of attenuation over time in response to continuing attempts to reestablish the communication link with the second communication terminal; and
   controlling the first communication terminal to continue to increase over time a power level at which it transmits communication signals in response to detecting loss of the communication link and to continuing attempts to reestablish the communication link with the second communication terminal.

10. The method of claim 1, wherein the first communication terminal controls a level of attenuation that a variable attenuator applies to a signal in a signal pathway between an antenna and a low noise amplifier of the first communication terminal.

11. The method of claim 10, wherein the first communication terminal controls the variable attenuator to cause the signal to be attenuated with at least a threshold level of attenuation in response detecting loss of the communication link, and then further controls the variable attenuator to cause the signal to be attenuated with decreasing levels of attenuation over time in response to continuing attempts to reestablish the communication link with the second communication terminal.

12. The method of claim 1, wherein detecting loss of the wireless communication link comprises detecting with the first communication terminal that the wireless communication link has become lost in response to not receiving a communication response from the second communication terminal within a threshold time after transmission of data to the second wireless communication terminal.

13. The method of claim 1, wherein detecting loss of the wireless communication link comprises detecting with the first communication terminal that the wireless communication link has become lost in response to determining that bit errors in a data packet received from the second wireless communication terminal exceeds a threshold number.

14. A communication terminal comprising:
a RF receiver circuit that is configured to receive communication signals from another communication terminal through a wireless communication link; and
a controller that is configured to respond to detecting loss of the communication link by increasing a level of attenuation that is applied to communication signals from the other communication terminal, and by then more gradually decreasing the level of attenuation over time in response to continuing attempts to reestablish the communication link with the other communication terminal,
wherein the controller is further configured to abruptly increase the level of attenuation in response to detecting loss of the communication link, and to then incrementally decrease the level of attenuation in response to occurrence of defined timing events, during which the RF receiver circuit attempts to receive communication signals from the other communication terminal, and to continuing attempts to reestablish the communication link with the other communication terminal.

15. A communication terminal comprising:
a RF receiver circuit that is configured to receive communication signals from another communication terminal through a wireless communication link; and
a controller that is configured to respond to detecting loss of the communication link by increasing a level of attenuation that is applied to communication signals from the other communication terminal, and by then more gradually decreasing the level of attenuation over time in response to continuing attempts to reestablish the communication link with the other communication terminal,
wherein the RF receiver circuit comprises a variable attenuator that applies a controllable level of attenuation to a signal in a signal pathway between an antenna and a low noise amplifier; and
wherein the controller is further configured to control the level of attenuation by the variable attenuator, and to respond to detecting loss of the communication link by increasing the level of attenuation by the variable attenuator and by then more gradually decreasing the level of attenuation by the variable attenuator over time in response to continuing attempts to reestablish the communication link with the other communication terminal.

16. The communication terminal of claim 15, wherein:
the variable attenuator comprises a pin diode and a current source that supplies a controllable bias current level to the pin diode, wherein the pin diode is connected to the signal pathway and is configured to vary an attenuation level of the signal in response to changes in the bias current level; and
the controller is further configured to control the current source to regulate the bias current level.

17. The communication terminal of claim 15, wherein:
the variable attenuator comprises a capacitor and a voltage source that supplies a controllable bias voltage level to the capacitor, wherein the capacitor is connected to the signal pathway and is configured to vary an attenuation level of the signal in response to changes in the bias voltage level; and
the controller is further configured to control the voltage source to regulate the bias voltage level.

18. A communication terminal comprising:
a RF receiver circuit that is configured to receive communication signals from another communication terminal through a wireless communication link;
a controller that is configured to respond to detecting loss of the communication link by increasing a level of attenuation that is applied to communication signals from the other communication terminal, and by then more gradually decreasing the level of attenuation over time in response to continuing attempts to reestablish the communication link with the other communication terminal; and
a RF transmitter circuit that is configured to transmit communication signals to the other communication terminal through the wireless communication link,
wherein the controller is further configured to continue over time to increase a power level at which it transmits communication signals to the other communication terminal in response to loss of the wireless communication link and to continuing attempts to reestablish the communication link with the other communication terminal.

19. The communication terminal of claim 18, wherein:
the controller is further configured to incrementally increase the transmission power level in response to occurrence of defined timing events, during which the RF transmitter circuit transmits communication signals to the other communication terminal, in response to continuing attempts to reestablish the communication link with the other communication terminal.

* * * * *